Jan. 15, 1952  G. COBY  2,582,818
METHOD OF MANUFACTURING GLASS AMPOULES
Filed April 13, 1948  3 Sheets-Sheet 1

INVENTOR.
George Coby
BY
Barlow & Barlow
ATTORNEYS.

Jan. 15, 1952 G. COBY 2,582,818
METHOD OF MANUFACTURING GLASS AMPOULES
Filed April 13, 1948 3 Sheets-Sheet 2
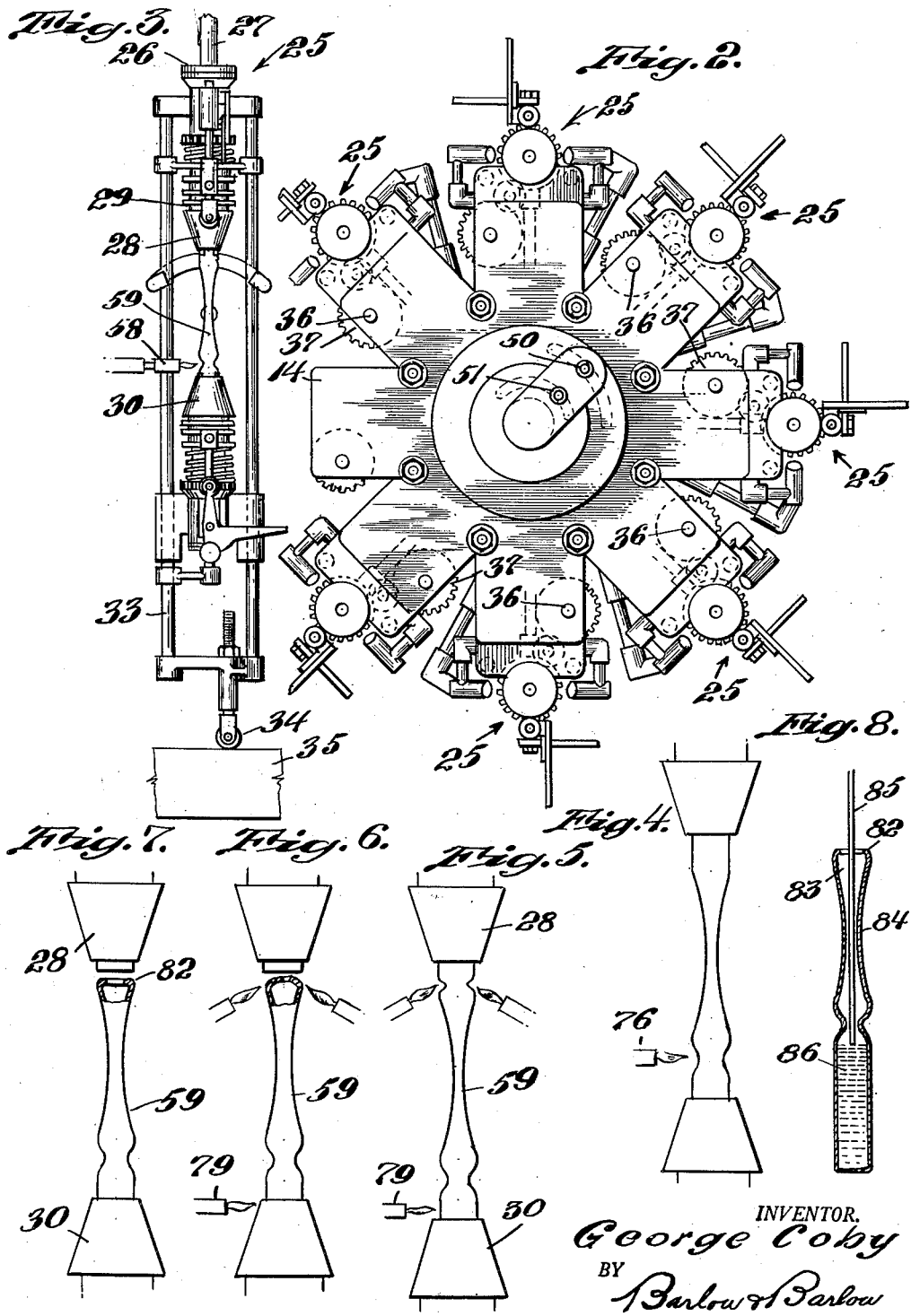
INVENTOR.
George Coby
BY
Barlow & Barlow
ATTORNEYS.

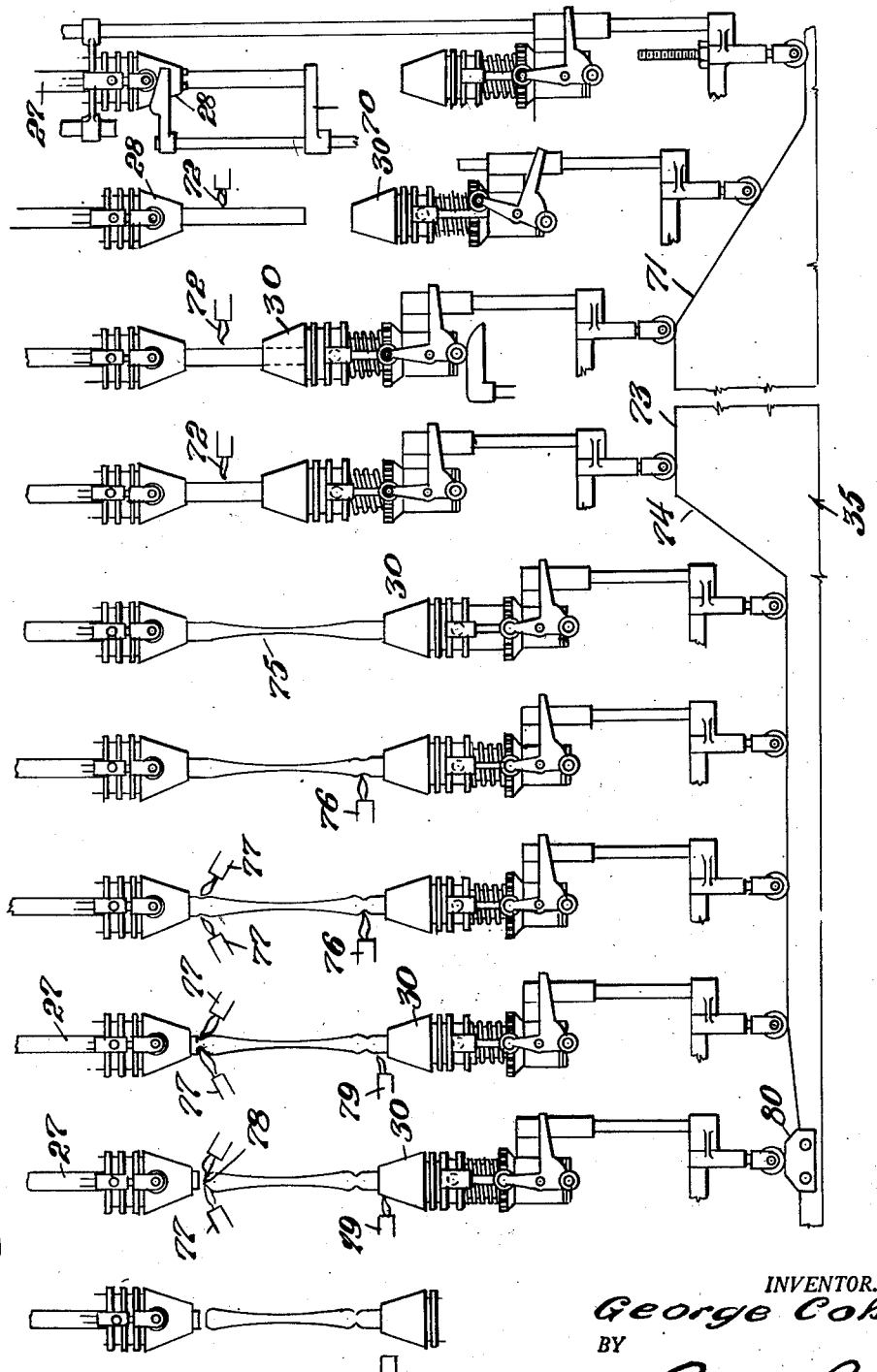

Patented Jan. 15, 1952

2,582,818

UNITED STATES PATENT OFFICE 2,582,818

METHOD OF MANUFACTURING GLASS AMPOULES

George Coby, Attleboro, Mass., assignor to United Products Co., Inc., a corporation of Rhode Island Application April 13, 1948, Serial No. 20,625

4 Claims. (Cl. 49—84)

1

This invention relates to a glass ampule such as is used for the storage of medicines or chemicals which it is desired shall be sealed against impurities.

Machines are provided for the manufacture of ampules, such for instance as illustrated in Patent No. 1,962,985 dated June 12, 1934. These machines are of the rotary character in which glass tubes are fed into the upper end of the rotary glass carrier and emerge from the lower end in the desired form. The ampules provided by such a machine are not only sealed at their lower end, but also at their upper end, and due to the cutting off of the ampule, which is heated at the upper end, the ampule usually draws in to form an inwardly extending conical formation. The ampules are then by hand usually cut off at the restricted narrow end. In the cutting-off step which is done when the glass is cool, small particles of glass at the time of breaking off or cutting off will be drawn by the partial vacuum within the ampule which has been sealed at both ends into the ampule. Attempts are made to remove this glass dust from the ampule by washing the same, but it is very difficult to do so; and, although great care may be used, there may still be dust collected in the ampule which will cause a rejection of the medicine or chemical which is contained therein. Attempts have been made to break this vacuum in order that there will be no dust drawn into the ampule as formed, and a separate machine for receiving the ampule after formed has been devised, such as shown in Patent 2,224,486, dated June 10, 1940. This machine will receive ampules formed as shown in the above-mentioned patent and will cause the vacuum to be broken so that glass dust will not be drawn into the ampule when severed at the narrow neck portion.

One of the objects of this invention is to provide an ampule with an open cut-off end in the same machine in which the ampule is formed and without the necessity of transferring the ampule to a separate machine, such as heretofore has been the practice when it is desired that the vacuum in the ampule be broken prior to breaking of the ampule at the narrow neck.

Another object of this invention is to provide an ampule delivered from the ampule-forming machine complete and of such structure that it is unnecessary to break the ampule at the restricted neck portion.

Another object of this invention is to provide an ampule with a shortened restricted neck portion so that the needle for loading the ampule may pass through the restricted neck portion without depositing any of the liquid on the restricted neck portion.

Another object of this invention is to utilize the heating which occurs in plasticizing the glass at the cut-off location to also serve for plasticizing of the glass for the blowing of an opening therein, thus reducing the necessity of two heatings at the cut-off location, one for cutting off and one for blowing out the end.

With these and other objects in view, the invention consists of certain novel features of construction as will be more fully described and particularly pointed out in the appended claims.

In the accompanying drawings:

Figure 2 is a top plan view of this machine;

Figure 3 is an elevation looking at one of the units which is carried about the center post of the machine;

Figures 4, 5, 6 and 7 are views of the ampule in the lower chuck illustrating the various steps in the severing of the ampule from the glass tube;

Figure 8 is a view of the ampule complete with the loading needle shown as inserted through the neck of the ampule;

Figure 9 is a schematic view illustrating the cam action in the manipulation of the lower chuck in the various states of advancement of the work through the machine and indicating the position of the flame which is directed upon the glass tube and ampule at the various locations.

Figure 1:
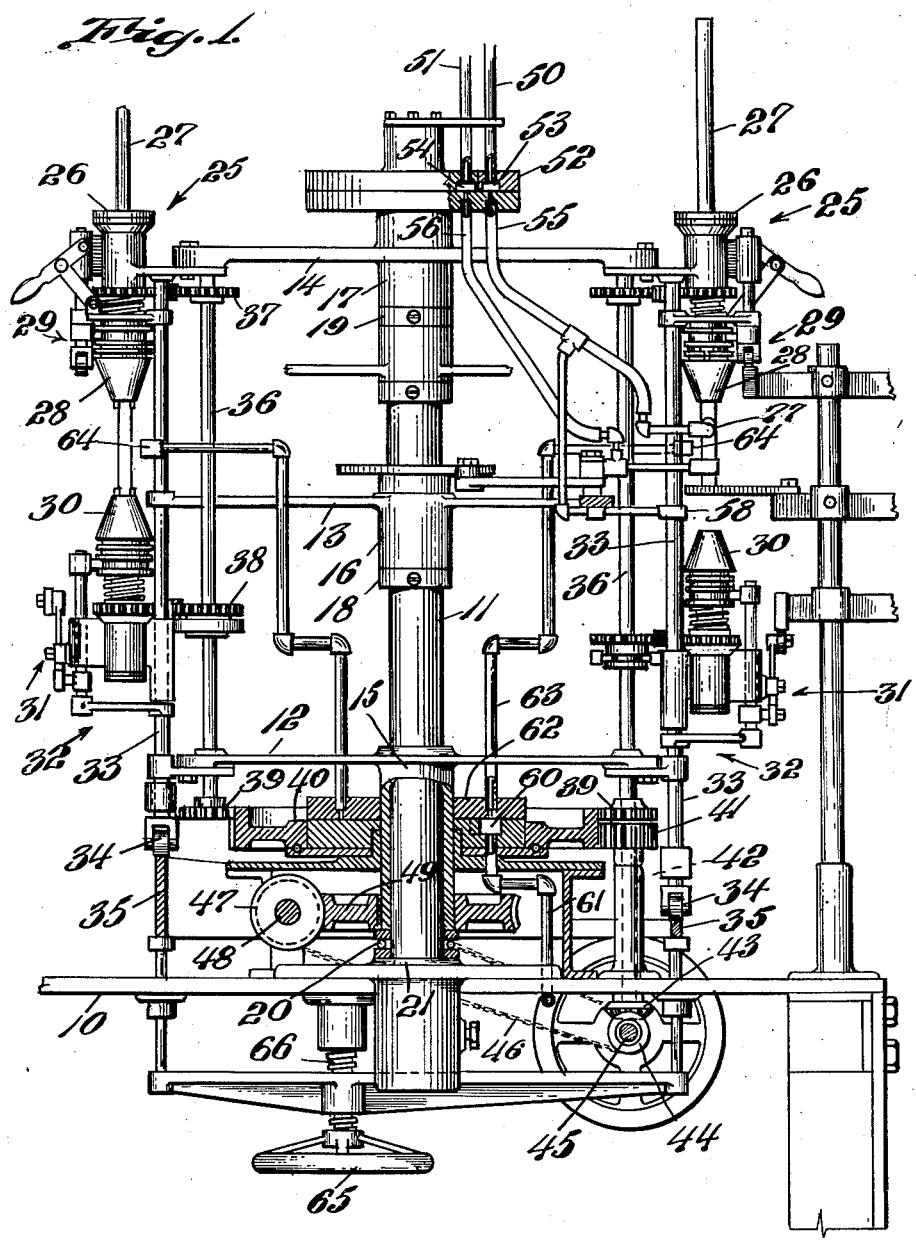
Figure 1 is a sectional view illustrating the essential parts of the machine in which the operations take place.

In proceeding with this invention, I modify the machine shown in Patent No. 1,962,985 by the addition of a flame at the lower part of the ampule just prior to and during the time of severing or cutting off the ampule from the tube from which it is formed and providing an appropriate cam for manipulation of the ampule with reference to the flame action so as to utilize the heating and plasticizing of the ampule at the cut-off location for blowing an opening in the ampule during or just subsequent to the cutting off and sealing operation so that the ampule emerges unsealed at its open end and provided with a funnel-type opening with a very rigid strengthened edge and with a sufficiently short restricted neck for later sealing so that the same may be filled with a needle without depositing liquid on the neck portion.

With reference to the drawings and particularly Figure 1 which illustrates the machine in general, there is shown a framework 10 from which there extends upwardly a fixed supporting post 11. Upon this supporting post there is provided three spiders 12, 13, and 14 each having a hub, as 15, 16, and 17, embracing the post 11 for rotation about the same. Collars 18 and 19 support the upper hubs, while the lower hub 15 rests upon a ball bearing 20 which in turn is supported by the box 21 on the framework.

These spiders support a plurality of units designated 25 for each operation upon a tube and forming an ampule by the operation. Each of these units consists essentially of a guide 26 for a glass tube 27, a chuck 28 to grip this glass tube, some cam means for opening and closing this chuck which is designated 29, a lower chuck 30 for gripping the lower end of the ampule and a means 31 for opening and closing the chuck and a means 32 for varying the elevation in order to control the height of the chuck 30 which means is operated through rods 33 having cam followers 34 engaging a cam 35 which encircles the post 11. The chucks which hold the work are rotated by means of shafts 36 each having a gear 37 at its upper end for rotating the upper chuck and a gear 38 opposite the lower chuck mounting for rotating the lower chuck. One shaft 36 extends through each of the spiders and is provided with a gear 39 at its lower end to mesh with the sun gear 40 so that as the carrier comprising the spiders and units 25 mounted thereon rotates about the post as a center rotary action will be imparted to the shaft 36 and in turn to the chucks which hold the work. This sun gear 40 is driven by a gear 41 on the upper end of the shaft 42 which has a beveled gear 43 at its lower end meshing with a beveled gear 44 on a drive shaft 45. The drive shaft 45 also, by reason of the chain 46, rotates the worm 47 on shaft 48 which worm meshes with the worm gear 49 fixed upon the hub 15. Thus, the hub is rotated about the post and, by reason of shafts 33 and 36 which extend from one spider to another, will transfer motion from one spider to another.

Gas and air pipes 50 and 51 lead into the fixed plate 52 for supplying the arcuate grooves 53 and 54 therein which feed other pipes extending through and rotating with the spiders as 55 and 56 carry the gas and air from these channels to each of the gas jets, as 58 for directing heat against the work 59 between the chucks. The length of the channels 53 and 54 will determine the length of time that the flame will remain on. A pilot may be provided for ignition when the gas is supplied. At the lower part of the machine, there is formed a channel 60 which is supplied by pipe 61 which pipe is fixed. An abutting plate 62 provided with a gas line 63 extends therefrom to such nozzles as 64 for heating the work. The length of this channel 60 will determine the location at which the gas will be fed. The cam 35 is shown somewhat expanded in Figure 9 and may be adjusted vertically by means of the hand wheel 65 and screw shaft 66. The cam 35 in its expanded relation, as shown in Figure 9, reading from right to left illustrates diagrammatically each operation by the units on the tube. The glass tube 27 will drop through the chuck 28 onto a stop 70, as shown at the right of Figure 9. The chuck 28 will then grip the glass tube and will move into a position beyond the stop 70. The chuck 30 will then move upwardly along the cam surface 71; and when at the top of the cam, this chuck 30 will grip the glass tube, as shown in the third position from the right of this figure. During this time heat is being applied by means of flame 72 from jet 64 which travels along with the glass tube from one position to another and at a proper time interval after the glass has become somewhat plastic, the chuck 30 will move from the horizontal surface incline 73 of the cam down the incline 74 of the cam so as to draw out and thin a neck portion 75 in the formation of the ampule. Another flame will then be directed against the ampule as at 76 from jet 58 and the cutting off flames 77 will be applied. As these cutting-off flames cause the glass to become more or less plastic, the chuck 30 will again be moved downwardly so as to sever the ampule as at 78 from the tube 27. This causes the flames 77 to be shifted slightly to engage along the upper edge of the neck 75 of the ampule formed; and, in the cutting off, the tube will become restricted at this cutting-off location and the glass will move inwardly to form sealing films across the neck 75 and the bottom of the next to be formed ampule. However, while the glass is still plastic at the cutting-off location, a heating flame 79 is applied to the ampule adjacent the lower end of the neck 75. A cam 80 raises the chuck 30 and at the same time the heating of the ampule by the flame 79 will cause the gaseous content of the ampule to expand sufficiently so as to blow the film which would otherwise seal the neck 75 at the said cut-off location. The said blown glass film will gather about the edge in a thickened condition as at 82 in Figure 7. These operations which have been just described are also shown on a larger scale in Figures 4 to 7. The ampule which is now completed will then be cooled and discharged from the chuck 30 onto a suitable belt which will convey the same to the loading point.

The ampule thus formed with the thickened edge 82 is of a funnel shape as at 83, while the restriction 84 is relatively short and in fact sufficiently short so that a loading needle 85 may be inserted through this restricted portion to load liquid as at 86 without causing the liquid to be deposited on the narrow neck portion 84. It thus becomes unnecessary to break the ampule at this restricted portion in most instances; although, if it is desired that the restricted portion be broken, the same may be done without danger of the vacuum sucking the dust or chips from the break into the ampule to contaminate the same.

I claim:

1. In the process of making an ampule at the end of a glass tube, the step of cutting off the ampule from the tube by the application of a severing flame at the cut-off location to plasticize the glass, moving the ampule away from the tube and out of register with the flame to sever the ampule and form a sealing film across the top of the ampule, applying auxiliary heat at a lower portion of said ampule to expand the air within the same to cause the said air to blow an opening through said film while still plastic and moving the ampule back into register with said flame during the time the film is being ruptured to cause the ruptured film to move toward the edge of the top of the ampule in a thickened mass.

2. In the process of making an ampule at the end of a glass tube, the step of cutting off the ampule from the tube by the application of a severing flame at the cut-off location to plasticize the glass, moving the ampule away from the tube and out of register with the flame to sever the ampule and form a sealing film across the top of the ampule, applying auxiliary heat at a lower portion of said ampule at the time the ampule is being moved away from the tube to expand the air within the same to cause the said air to blow an opening through said film while still plastic and moving the ampule back into register with said flame during the time the film is being ruptured to cause the ruptured film to move toward the edge of the top of the ampule in a thickened mass.

3. In the process of making an ampule at the end of a glass tube, the step of cutting off the ampule from the tube by the application of a severing flame at the cut-off location to plasticize the glass, moving the ampule away from the tube and out of register with the flame to form a restriction and severing of the ampule and form a sealing film across the top of the ampule, applying auxiliary heat at a lower portion of said ampule to expand the air within the same to cause the said air to blow an opening through said film while still plastic and moving the ampule back into register with said flame during the time the film is being ruptured to cause the ruptured film to move toward the edge of the top of the ampule in a thickened mass.

4. In the process of making an ampule at the end of a glass tube, the step of cutting off the ampule from the tube by the application of a severing flame at the cut-off location to plasticize the glass, moving the ampule away from the tube and out of register with the flame to sever the ampule and form a sealing film across the top of the ampule, applying auxiliary heat at a lower portion of said ampule at the time the ampule is being moved away from the tube to expand the air within the same to cause the said air to blow an opening through said film while still plastic and moving the ampule back into register with said flame and out of register with said auxiliary heat during the time the film is being ruptured to cause the ruptured film to move toward the edge of the top of the ampule in a thickened mass.

GEORGE COBY.

REFERENCES CITED

The following references are of record in the file of this patent:

UNITED STATES PATENTS

| Number | Name | Date |
|---|---|---|
| 1,962,985 | Dichter | June 12, 1934 |

OTHER REFERENCES

Ser. No. 418,604, Dichter (A. P. C.), published April 27, 1943.